United States Patent Office 3,686,067
Patented Aug. 22, 1972

3,686,067
FIRE-RETARDANT FOAM ARTICLES
Joseph Blair Williams, Groves Tex., assignor to E. I. du Pont de Nemours and Company, Wilmington, Del.
No Drawing. Filed Nov. 16, 1970, Ser. No. 90,007
Int. Cl. B32b 3/26; C09k 3/28
U.S. Cl. 161—160
19 Claims

ABSTRACT OF THE DISCLOSURE

Fire-retardant articles comprising foam with at least one but less than all of the surfaces of said foam covered with fire-retardant paint, metal foil, plasticized polyvinyl chloride film containing 10 to 20 percent by weight plasticizer, polyvinyl fluoride film, or film of pyromellitic dianhydride and 4,4'-diaminodiphenyl ether, at least one of said covered surfaces being at least 30 percent of the total surface area of the foam, said foam having a density of less than about 30 lbs./ft.$^3$ and being produced by foaming a composition comprising (A) at least 40 percent by weight alpha,beta-ethylenically unsaturated carboxylic acid copolymers and/or ionomers made therefrom, (B) 1 to 50 percent by weight antimony trioxide, and (C) a complemental amount of solid halogenated hydrocarbon, said hydrocarbon containing from 50 to 80 percent by weight halogen with the provisos that the mole ratio of antimony to halogen is from 1:½ to 1:45 and the weight of (B)+(C) is at least 10 percent of the total weight of the composition.

---

This invention relates to fire-retardant articles. Particularly, this invention relates to fire-retardant foams with at least one but less than all of the surfaces of the foam covered with fire-retardant film, fire-retardant paint, or metal foil.

Fire-retardant foams such as foams made from copolymers and alpha-olefins and alpha,beta-ethylenically unsaturated carboxylic acids and/or ionomers made therefrom containing antimony trioxide and halogenated hydrocarbons are known. Such foams are fire-retardant, i.e., are self-extinguishing according to ASTM 1692–67T. However, a foam type structure was desired which could pass more stringent fire-retardancy tests than those which the known foam could pass.

Such a structure has been found. It is a fire-retardant article which comprises a foam with at least one but less than all of the surfaces of said foam covered with a material selected from the class consisting of fire-retardant paint, metal foil, plasticized polyvinyl chloride film containing 10 to 20 percent by weight plasticizer, polyvinyl fluoride film, and a film of pyromellitic dianhydride and 4,4'-diaminodiphenyl ether, at least one of said covered surfaces being at least 30 percent of the total surface area of the foam, said foam having a density of less than about 30 lbs./ft.$^3$ and being produced by foaming a foamable composition comprising (A) at least 40 percent by weight of a member selected from the class consisting of (1) copolymers of alpha-olefins having the general formula RCH=CH$_2$ where R is a radical selected from the class consisting of hydrogen and alkyl radicals having from 1 to 8 carbon atoms and alpha,beta-ethylenically unsaturated carboxylic acids having from 3 to 8 carbon atoms wherein the carboxylic acid groups are randomly distributed over all molecules and wherein (a) the alpha-olefin content of the copolymer is at least 60 mole percent, based on the alpha-olefin acid copolymer, (b) the unsaturated carboxylic acid content of the copolymer is from 1 to 10 mole percent, based on the alpha-olefin/acid copolymer, and (c) any other monomer component optionally copolymerized in said copolymer is monoethylenically unsaturated; (2) the copolymers of (1) wherein 5 to 95 percent of the carboxylic acid groups are ionized by neutralization with metal ions uniformly distributed throughout the copolymer, said metal ions having an ionized valence of from one to three inclusive, when the unsaturated acid is a monocarboxylic acid and an ionized valence of one when the unsaturated acid is a dicarboxylic acid and said metal ions being selected from the group consisting of uncomplexed and complexed metal ions; and (3) mixtures of (1) and (2); (B) 1 to 50 percent by weight of antimony trioxide and (C) a complemental amount of a solid halogenated hydrocarbon, said hydrocarbon containing from 50 to 80 percent by weight halogens; with the provisos that the mole ratio of antimony to halogen is from 1:½ to 1:45 and the weight of (B)+(C) is at least 10 percent of the total weight of the foamable composition.

The invention also includes the method of improving the fire-retardancy of the foam which comprises covering at least one but less than all the surfaces of the foam with one of the members of the aforementioned class with the proviso that at least one of the surfaces covered is at least 30 percent of the total surface area of the foam.

Throughout the specification and claims "surfaces" is meant to refer to the ends, as well as the sides of the foam. For instance, in a foam with rectangular cross section, the two wider sides, two narrow sides, and the ends of the foam are its surfaces. Any shape of foam can be utiilzed in the invention. As stated above, the covering material must cover at least one surface of the foam but can cover more than one as long as it does not cover all the surfaces of the foam. However, at least one of the surfaces covered must be at least 30 percent of the total area of the foam in order for the fire-retardancy of the foam to be increased significantly. Preferably, at least one of the sufaces covered is at least 40 percent of the total surface area of the foam.

The alpha-olefins useful in the alpha-olefin/acid copolymers and/or ionomers utilized in the foam are alpha-olefins which have the general formula RCH=CH$_2$ where R is either a hydrogen or an alkyl group having preferably from 1 to 8 carbon atoms. Thus, suitable olefins include ethylene, propylene, butene-1, pentene-1, hexene-1, heptene-1,3-methylbutene - 1,4 - methylpentene-1, etc. The concentration of alpha-olefin in the alpha-olefin/acid copolymers and ionomers is at least 60 mole percent and is preferably greater than 80 mole percent.

The alpha,beta - ethylenically unsaturated carboxylic acids which are useful in the alpha-olefin/acid copolymers and ionomers contain from 3 to 8 carbon atoms. The preferred amount of the alpha-beta-ethylenically unsaturated carboxylic acid in the alpha-olefin/alpha,beta-ethylenically unsaturated carboxylic acid copolymers and ionomers is from 1 to 6 mole percent. Examples of monomers which contain the alpha - beta - ethylenically unsaturated carboxylic acid groups are acrylic acid, methacrylic acid, ethacrylic acid, itaconic acid, maleic acid, fumaric acid, monoesters of said dicarboxylic acids such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purpose of the present invention because of its chemical reactivity being that of an acid. Similarly, other alpha-beta-monoethylenically unsaturated anhydrides of carboxylic acids can be employed. The preparation of the alpha-olefin/acid copolymers is well known (see U.S. Pat. 3,264,272).

The alpha-olefin/acid copolymers need not necessarily contain only two components. Thus, although the olefin content of the copolymer should be at least 60 mole percent, more than one olefin can be employed to provide the hydrocarbon nature of the copolymer. Additionally, other copolymerizable monoethylenically unsaturated monomers, illustrative members of which are mentioned below in this paragraph, can be employed in combination with the olefin and the carboxylic acid comonomer. The scope of alpha-olefin/acid copolymers suitable for use in the present invention is illustrated in the following examples: ethylene/acrylic acid copolymers, ethylene/methacrylic acid copolymers, ethylene/itaconic acid copolymers, ethylene/methyl hydrogen maleate, copolymers, ethylene/maleic acid copolymers, ethylene/acrylic acid/ methyl methacrylate copolymers, ethylene/methacrylic acid/ethyl acrylate copolymers, ethylene/itaconic acid/ methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

The preferred alpha-olefin/acid copolymers are those obtained through direct polymerization of ethylene with a monocarboxylic acid copolymer, in particular, methacrylic acid or acrylic acid.

The ionic copolymers (ionomers) of the present invention are obtained by reaction of the above-described alpha-olefin/acid copolymers with an ionizable metal compound. Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X_m$, where $n$ is the ionic charge and is at least one, X is a nonionized group and $n+m$ equal the valence of the metal. The utility of complexed metal ions employed in the formation of ionic copolymers corresponds in their ionized valences to those of the uncomplexed metal ions. The monovalent metals are, of course, excluded but higher valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers of the present invention, therefore comprise for the alpha-olefin-monocarboxylic acid copolymers, mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Hg^{+2}$, $Sn^{+2}$, $Pb^{+2}$, $Fe^{+2}$, $Co^{+2}$, $Ni^{+2}$ and $Zn^{+2}$. Suitable metal trivalent ions are $Al^{+3}$, $Sc^{+3}$, $Fe^{+3}$ and $Y^{+3}$.

The preferred metal ions are $Na^+$ and $Zn^{+2}$. The quantity of the ions employed or the degree of neutralization will differ with the degree of solid property change and the degree of melt property change desired. In general, it was found that the concentration of the metal ion should be at least such that the metal ion neutralizes at least 5 percent of the carboxylic acid groups in order to obtain a significant change of properties from the alpha-olefin/acid copolymers. The degree of neutralization for the optimum properties will vary with the acid concentration and the molecular weight of the copolymer. The neutralization is accomplished as is described in U.S. Pat. 3,264,272 and can be measured by several well-known techniques which are set forth in said patent.

The molecular weight of the alpha-olefin/alpha,beta-ethylenically unsaturated carboxylic acid copolymers and/ or ionomers is indicated by the melt index which ranges normally from 0.3 to 200 grams per 10 minutes with the preferred range being from 0.5 to 50 grams per 10 minutes. The melt index is determined according to ASTM D–1238–65T.

The foam of the present invention can be produced from a composition containing any mixture of the alpha-olefin acid copolymers with the ionomers made from the copolymers or from either the alpha-olefin/acid copolymers or ionomers singly. The combination or lack thereof will be determined by the final foam properties desired.

The amount of alpha-olefin/alpha,beta-ethylenically unsaturated carboxylic acid copolymers and/or ionomers used relative to the total weight of the composition to be foamed is at least 40 percent by weight but can be as much as 90 percent while the combined weight of the antimony trioxide and solid halogenated hydrocarbon is at least 10 percent by weight. It is preferred that as much of the alpha-olefin/alpha,beta-ethylenically unsaturated carboxylic acid copolymers and/or ionomers is used as possible while retaining the required fire retardance of the covering layer. The normal fire-retardancy of the foam before addition is that required for materials to be self-extinguishing according to ASTM 1692–67T.

The antimony trioxide used in the composition to be foamed is preferably from 5 to 20 percent by weight of the composition which is to be foamed while the mole ratio of antimony to halogen in the composition is preferably from 1:1 to 1:10. The mole ratio of antimony to halogen depends on the type of solid halogenated hydrocarbon utilized.

"Solid halogenated hydrocarbon" is meant to refer to any hydrocarbon containing halogen atoms substituted for hydrogen atoms to the extent of from 50 percent to 80 percent of the total weight of the halogenated hydrocarbon regardless of how said halogen is introduced into the molecule. Thus, within the purview of this invention, are compounds having substantially linear aliphatic hydrocarbon chains containing halogen substituents, aliphatic cyclic hydrocarbons containing halogen substituents, aromatic hydrocarbon nuclei containing halogen substituents, and aromatic-aliphatic hydrocarbons containing halogen substituents in the chain and/or nucleus. The hydrocarbons can also contain oxygen substitution. The preferred amount of halogen in the halogenated hydrocarbons is 60 to 75 percent by weight.

The preferred halogenated hydrocarbons are the chlorinated hydrocarbons. Examples of different types of solid chlorinated hydrocarbons are chlorinated paraffin, chlorinated propanes, chlorinated propylenes, hexachloroethane, chlorinated polyethylene, chlorinated polyisobutylene, polyvinyl chloride, vinylidene chloride, post-chlorinated polyvinyl chloride, chlorinated polyphenyls, chlorinated naphthalenes, hexachlorobenzene, chlorinated indenes, chlorinated polystyrenes, chlorinated diphenyl alkanes, chlorinated norbornenes, etc.

The preferred chlorinated hydrocarbons are "Chlorowax 70" (Diamond Alkali, Inc.), a chlorinated paraffin containing about 70 percent by weight chlorine, "Dechloranes" (Hooker Chemical Co.), which are Diels-Alder products of hexachlorocyclopentadiene and various dieneophiles such as furan or 1,4-cyclooctadiene, and chlorinated polyethylene. The mole ratio of antimony to halogen in the foamable composition when "Chlorowax 70" is utilized, is normally from 1:½ to 1:4 and preferably from 1:1 to 1:2 while the mole ratio of antimony to halogen in the foamable composition when the "Dechloranes" are utilized is normally 1:½ to 1:45, preferably 1:2 to 1:10.

The foaming of the foamable composition can be accomplished by a number of conventional methods. A procedure similar to that in U.S. Pat. 3,160,688 is exemplary. Foaming can be accomplished by blending all of the components of the foamable composition in an extruder and then foaming the melted blend via a blowing agent as it passes out the extruder through a die. Concentrates of the foamable composition can be prepared and extended in Banbury mixers, roll mills, or extruders through standard extrusion and pelletizing techniques. The extended concentrates are the foamable compositions which are then extruded and foamed via a blowing agent through a die. The concentrates can contain all the components of the foamable composition or only some of them before extension.

Blowing agents which may be utilized in foaming composition are solid types such as sodium bicarbonate and azobisformamide and liquid types such as dichlorotetrafluoroethane, dichlorodifluoromethane, and trichlorofluoromethane. The solid-type blowing agents are normally blended with the foamable composition in the extruder and decompose at the temperature of the melt while the liquid blowing agents are normally injected directly into the extruder barrel under pressure.

Nucleating agents may also be blended with the foamable composition prior to foaming and are useful in causing the foam structure to form. However, the fire-retardant materials in the compositions of this invention act as their own nucleating agents; and, therefore, other nucleating agents are not required. Normally utilized nucleating agents are barium sulfate, calcium carbonate, bentonite clay, common clay, and calcium stearate. Normal stabilizers for alpha-olefin/alpha,beta-ethylenically unsaturated carboxylic acid copolymers and ionomers can also be incorporated but are not required. Dyes, pigments, etc. may also be incorporated into the foamable composition.

The temperature of the foamable composition during foaming, i.e., during blending, pelletizing, etc. should normally not exceed about 230° C. and is dependent on the type of solid halogenated hydrocarbon utilized, the amount of hold-up time at said temperature, etc. For some of the solid halogenated hydrocarbons utilized in the foamable compositions the temperature must be less than 230° C. in order for the foam to have the desired density, appearance, etc. The foam should have a density of less than about 30 lbs./ft.³ in order for the fire-retardancy to be effectively increased by the addition of the covering layer on at least one but less than all of its surfaces.

The materials which can be utilized in covering at least one but less than all of the surfaces of the foam as recited above, are polyvinyl fluoride, a polyamide film of pyromellitic dianhydride and 4,4'-diaminodiphenyl ether, metal foils, plasticized polyvinyl chloride film containing 10 to 20 percent by weight plasticizer, and fire-retardant paint. Examples of plasticizer normally utilized in polyvinyl chloride are di(2-ethylhexyl)adipate and dicyclohexyl phthalate. The preferred metal foil is aluminum foil. These materials, except for the fire-retardant paint, may be attached to the foam in any conventional manner, such as gluing, heat bonding, etc. The preferred covering materials are metal foil and fire-retardant paint.

The fire-retardant paints which are useful in the present invention are fire-retardant intumescent paints based on phosphorus containing compounds. An example of a phosphorus containing fire-retardant paint is fire-retardant paint No. 987 from Ocean Chemical Corporation. Another example of a phosphorus containing intumescent paint is one containing 56 parts of monoammonium phosphate, 10 parts dicyandiamide, 22 parts pentaerythritol, 12 parts titanium dioxide, 5 parts diphenyl phthalate, 1.25 parts wetting agent, 47–34 parts water and 40 parts Dow TVC Latex 744–B. Other conventional fire-retardant paints such as those containing borax (U.S.P. 2,939,794), or tetrachlorophthalic anhydride are useful as fire-retardant covering layers for the foam in the present invention.

The foam in the foam structure is normally in the shape of a sheet which is normally .15 to 1 inch thick. Other shapes may also be utilized. The foam structure is useful as insulation material such as insulation for airplanes.

The following examples are meant to illustrate but not to limit the invention. All parts and percentages are by weight unless otherwise specified.

In the examples, the McDonnell Douglas Corporation vertical burn test procedure is as follows: Each specimen is supported vertically and tested in the appropriate apparatus. The specimen is exposed to a Bunsen burner or Tirrill burner, with a nominal ⅜" I.D. tube adjusted to give a flame of 1½" in height. The flame temperature measured by a thermocouple in the center of the flame is 843° C. minimum. The flame is to be applied to the most critical exposed portion of the specimen. The lower edge of the specimen being tested is ¾" above the top of the burner. The flame is applied for 12 or 60 seconds and then removed. Flame time and burn length are recorded. Burn length is defined as the distance from the original edge to the farthest evidence of the damage to the test specimen due to flame impingement, including areas of partial or complete consumption, charring, or embrittlement, but not including areas sooted, stained, warped or discolored, nor areas where the material has shrunk away from the heat source. In order to pass the test, the average burn length shall not exceed 6" and the average flame time after removal of the flame source shall not exceed 15 seconds.

EXAMPLE I

Fire-retardant ionomer foam was prepared by foaming the following components:

| Component | | Amount parts |
|---|---|---|
| A | Ethylene/methacrylic acid copolymer containing 12 percent by weight methacrylic acid polymerized units neutralized 40 percent with zinc ions; melt index 0.5 gram/10 minutes. | 50 |
| B | 23.1 percent by weight, ethylene/methacrylic acid copolymer containing 15 percent by weight methacrylic acid polymerized units; melt index 25 grams/10 minutes. 50 percent by weight, antimony trioxide. 26.9 percent by weight, "Chlorowax 70" (chlorinated paraffin containing approximately 70 percent by weight chlorine). | 50 |

Also prepared was a foam made of entirely Component A. Samples of both foams were heat laminated on 1 or 2 sides with ¾ mil aluminum aluminum foil. Test specimens with dimensions of 12½" x 4½" were tested utilizing the McDonnell Douglas Corporation vertical burn test, the length of the test being specified in Table I. The samples which had 1 or 2 sides laminated with aluminum foil had such on 1 or 2 of their 12½" x 4½" sides. Results of the tests on the samples are depicted in Table I.

TABLE I

| Sample type | No. of sides laminated | Foam thickness (in.) | Length of test (sec.) | Foam density (lbs./ft.³) | Flame time (sec.) | Burn length (in.) |
|---|---|---|---|---|---|---|
| Foam of A+B | 0 | 0.21 | 12 | 6.4 | 55 | 10-12 |
| Foam of A | 1 | 0.18 | 12 | 7.8 | 447 | (¹) |
| Foam of A+B | 1 | 0.21 | 12 | 5.8 | 0 | 1¾ |
| Do | 1 | 0.21 | 60 | 5.8 | 0 | 7 |
| Do | 2 | 0.21 | 12 | 5.8 | 0 | 1½ |
| Do | 2 | 0.21 | 60 | 5.8 | 0 | 4 |

¹ Completely consumed.

EXAMPLE II

A fire-retardant foam was prepared from the following components:

| Component | | Amount, parts |
|---|---|---|
| A | Ethylene/methacrylic acid copolymer containing 12 percent by weight methacrylic acid polymerized units neutralized 40 percent with zinc ions; melt index, 0.5 grams/10 minutes. | 60 |
| B | 23.1 percent by weight, ethylene/methacrylic acid copolymer containing 15 percent by weight methacrylic acid polymerized units; melt index, 25 grams/10 minutes. 50 percent by weight, antimony trioxide. 26.9 percent by weight "Chlorowax 70" (chlorinated paraffin containing approximately 70 percent by weight chlorine). | 40 |

Also, foam was prepared from entirely of Component A. Samples were prepared with the dimensions of those in Example I from the fire-retardant foam and some were painted with fire-retardant paint No. 987 from Ocean Chemical Corporation, the painting being done on one side, i.e., one of the 12½" x 4½" sides. The samples were tested according to the McDonnell Douglas Corporation vertical burn test as in Example 1. Results are given in Table II.

TABLE II

| Sample type | No. of sides painted | Foam thickness (in.) | Length of test (sec.) | Foam density (lbs./ft.³) | Flame time (sec.) | Burn length (in.) |
|---|---|---|---|---|---|---|
| Foam of A | 1 | 0.19 | 60 | 4.8 | 35 | (¹) |
| Foam of A+B | 0 | 0.23 | 12 | 5.2 | 155 | (¹) |
| Do | 1 | 0.23 | 12 | 5.2 | 0 | 4 |
| Do | 1 | 0.23 | 60 | 5.2 | 0 | 6 |

¹ Completely consumed.

EXAMPLE III

A fire-retardant foam was prepared utilizing the same components in the same proportions of Example II. The density of the foam was 5.2 lbs./ft.³. Samples of the foam with the dimensions of those in Example I were covered on one of the 12½" x 4½" sides of the sample with (a) polyvinyl fluoride film and (b) a film of pyromellitic dianhydride and 4,4'-diaminodiphenyl ether, respectively, by cementing the film to the foam with rubber cement. The results of McDonnell Douglas Corporation vertical burn test conducted as in Example I were as follows:

TABLE III

| Type of covering material | Foam thickness (in.) | Length of test (sec.) | Flame time (sec.) | Burn length (in.) |
|---|---|---|---|---|
| (a) | 0.23 | 12 | 0 | 2½-3¼ |
| (b) | 0.23 | 12 | 0 | 3-4 |
|  | 0.23 | 60 | 6 | 5-6 |

EXAMPLE IV

A fire-retardant foam was prepared utilizing the same components as in Example II but with Component A being 70 percent by weight of the total composition foamed and Component B being 30 percent by weight of the total composition foamed. The foam had a density of 5.6 lbs./ft.³. Samples of the foam with dimensions of 2" x 12" were covered on one of their 2" x 12" sides with 1 mil (approximately) plasticized polyvinyl chloride film by cementing the film to the foam with rubber cement. The results of the McDonnell Douglas Corporation vertical burn test were as follows:

TABLE IV

| Length of test (sec.) | Foam thickness (in.) | Flame time (sec.) | Burn length (in.) |
|---|---|---|---|
| 12 | 0.24 | 0 | 4½-5½ |
| 60 | 0.24 |  | (¹) |

¹ Sample separated into 2 portions, therefor, burn length wasn't determined.

I claim:

1. A fire-retardant article comprising a foam with at least one but less than all of the surfaces of said foam covered with a material selected from the class consisting of fire-retardant paint, metal foil, plasticized polyvinyl chloride film containing 10 to 20 percent by weight plasticizer, polyvinyl fluoride film, and a film of pyromellitic dianhydride and 4,4'-diaminodiphenyl ether, at least one of said covered surfaces being at least 30 percent of the total surface area of the foam, said foam having a density of less than about 30 lbs./ft.³ and being produced by foaming a foamable composition comprising (A) at least 40 percent by weight of a member selected from the class consisting of (1) copolymers of alpha-olefins having the general formula $RCH=CH_2$ where R is a radical selected from the class consisting of hydrogen and alkyl radicals having from 1 to 8 carbon atoms and alpha,beta-ethylenically unsaturated carboxylic acids having from 3 to 8 carbon atoms wherein the carboxylic acid groups are randomly distributed over all molecules and wherein (a) the alpha-olefin content of the copolymer is at least 60 mole percent, based on the alpha-olefin/acid copolymer, (b) the unsaturated carboxylic acid content of the copolymer is from 1 to 10 mole percent based on the alpha-olefin/acid copolymer, and (c) any other monomer component optionally copolymerized in said copolymer is monoethylenically unsaturated; (2) the copolymers of (1) wherein 5 to 95 percent of the carboxylic acid groups are ionized by neutralization with metal ions uniformly distributed throughout the copolymer, said metal ions having an ionized valence of from one to three inclusive, when the unsaturated acid is a monocarboxylic acid and an ionized valence of one when the unsaturated acid is a dicarboxylic acid and said metal ions being selected from the group consisting of uncomplexed and complexed metal ions; and (3) mixtures of (1) and (2); (B) 1 to 50 percent by weight of antimony trioxide and (C) a complemental amount of a solid halogenated hydrocarbon, said hydrocarbon containing from 50 to 80 percent by weight halogen; with the provisos that the mole ratio of antimony to halogen is from 1:½ to 1:45 and the weight of (B)+(C) is at least 10 percent of the total weight of the foamable composition.

2. The article of claim 1 in which the foam is in the shape of a sheet.

3. The article of claim 1 in which the material covering at least one but less than all of the surfaces of the foam is fire-retardant paint.

4. The article of claim 3 in which fire-retardant paint is intumescent and is based on phosphorus containing compounds.

5. The article of claim 1 in which the material covering at least one but less than all of the surfaces of the foam is metal foil.

6. The article of claim 5 in which the metal foil is aluminum foil.

7. The article of claim 1 wherein (A)(1) of the foamable composition is a copolymer of $CH_2=CH_2$ and an alpha,beta-ethylenically unsaturated carboxylic acid selected from the class consisting of acrylic acid and metacrylic acid (A)(2) is a copolymer of $CH_2=CH_2$ and an alpha,beta-ethylenically unsaturated carboxylic acid selected from the class consisting of acrylic and methacrylic acid which has 10 to 90 percent of its carboxylic acid groups neutralized by a metal ion selected from the class consisting of $Na^+$ and $Zn^{+2}$, and (A)(3) is a mixture of a copolymer of $CH_2=CH_2$ and an alpha, beta-ethylenically unsaturated carboxylic acid selected from the class consisting of acrylic acid and methacrylic acid, and a copolymer of $CH_2=CH_2$ and an alpha,beta-ethylenically unsaturated carboxylic acid selected from the class consisting of acrylic and methacrylic acid which has 5 to 95 percent of the carboxylic acid groups neutralized by a metal ion selected from the class consisting of $Na^+$ and $Zn^{+2}$.

8. The article of claim 7 wherein the foamable composition is 5 to 20 percent by weight antimony trioxide.

9. The article of claim 8 wherein the solid halogenated hydrocarbon of the foamable composition is chlorinated paraffin and the mole ratio of antimony to halogen in the foamable composition is 1:1 to 1:2.

10. The article of claim 9 in which the material covering at least one but less than all of the surfaces of the foam is fire-retardant paint.

11. The article of claim 10 in which the foam is in the shape of a sheet.

12. The article of claim 9 in which the material covering at least one but less than all of the surfaces of the foam is metal foil.

13. The article of claim 12 in which the foam is in the shape of a sheet.

14. The article of claim 8 wherein the solid halogenated hydrocarbon of the foamable composition is a Diels-Alder product of hexachlorocyclopentadiene and a member selected from the class consisting of furan and 1,4-cyclooctadiene and the mole ratio of antimony to halogen in the foamable composition is 1:2 to 1:10.

15. The article of claim 14 in which the material covering at least one but less than all of the surfaces of the foam is fire-retardant paint.

16. The article of claim 15 in which the foam is in the shape of a sheet.

17. The article of claim 14 in which the material covering at least one but less than all of the surfaces of the foam is metal foil.

18. The article of claim 17 in which the foam is in the shape of a sheet.

19. A process for improving the fire-retardancy of a foam which has a density of less than about 30 lbs./ft.³ and which is produced by foaming a foamable composition comprising (A) at least 40 percent by weight of a member selected from the class consisting of (1) copolymers of alpha-olefins having the general formula $RCH=CH_2$ where R is a radical selected from the class consisting of hydrogen and alkyl radicals having from 1 to 8 carbon atoms and alpha,beta-ethylenically unsaturated carboxylic acids having from 3 to 8 carbon atoms wherein the carboxylic acid groups are randomly distributed over all molecules and wherein (a) the alpha-olefin content of the copolymer is at least 60 mole percent, based on the alpha-olefin/acid copolymer, (b) the unsaturated carboxylic acid content of the copolymer is from 1 to 10 mole percent, based on the alpha-olefin/acid copolymer, and (c) any other monomer component optionally copolymerized in said copolymer is monoethylenically unsaturated; (2) the copolymers of (1) wherein 5 to 95 percent of the carboxylic acid group are ionized by neutralization with metal ions uniformly distributed throughout the copolymer, said metal ions having an ionized valence of from one to three inclusive, when the unsaturated acid is a monocarboxylic acid and an ionized valence of one when the unsaturated acid is a dicarboxylic acid and said metal ions being selected from the group consisting of uncomplexed and complexed metal ions; and (3) mixtures of (1) and (2); (B) 1 to 50 percent by weight of antimony trioxide and (C) a complemental amount of a solid halogenated hydrocarbon, said hydrocarbon containing from 50 to 80 percent by weight halogen; with the provisos that the mole ratio of antimony to halogen is from 1:½ to 1:45 and the weight of (B)+(C) is at least 10 percent of the total weight of the foamable composition which comprises covering covering at least one but less than all of the surfaces of said foam with a material selected from the class consisting of fire-retardant paint, metal foil, plasticized polyvinyl chloride film containing 10 to 20 percent by weight plasticizer, polyvinyl fluoride film, and a film of pyromellitic dianhydride and 4,4′-diaminodiphenyl ether with the proviso that at least one of the covered surfaces is at least 30 percent of the total surface area of the foam.

References Cited

UNITED STATES PATENTS

| | | | |
|---|---|---|---|
| 2,986,535 | 5/1961 | Jacobson | 260—2.5 |
| 2,931,746 | 4/1960 | Robitschek | 260—2.5 X UX |
| 3,338,739 | 8/1967 | Rees | 260—25 X |
| 3,466,222 | 9/1969 | Curtis | 161—160 |
| 3,202,567 | 8/1965 | Muri et al. | 161—403 X |
| 3,437,536 | 4/1969 | Vincent et al. | 161—160 X |
| 3,498,404 | 3/1970 | Roberts | 161—160 X |
| 3,264,272 | 8/1966 | Rees | 117—128 X |

WILLIAM D. MARTIN, Primary Examiner

H. J. GWINNELL, Assistant Examiner

U.S. Cl. X.R.

117—137, 138.8 UA; 156—306; 161—161, 189, 216, 403; 260—2.5 FP